Patented Aug. 8, 1933

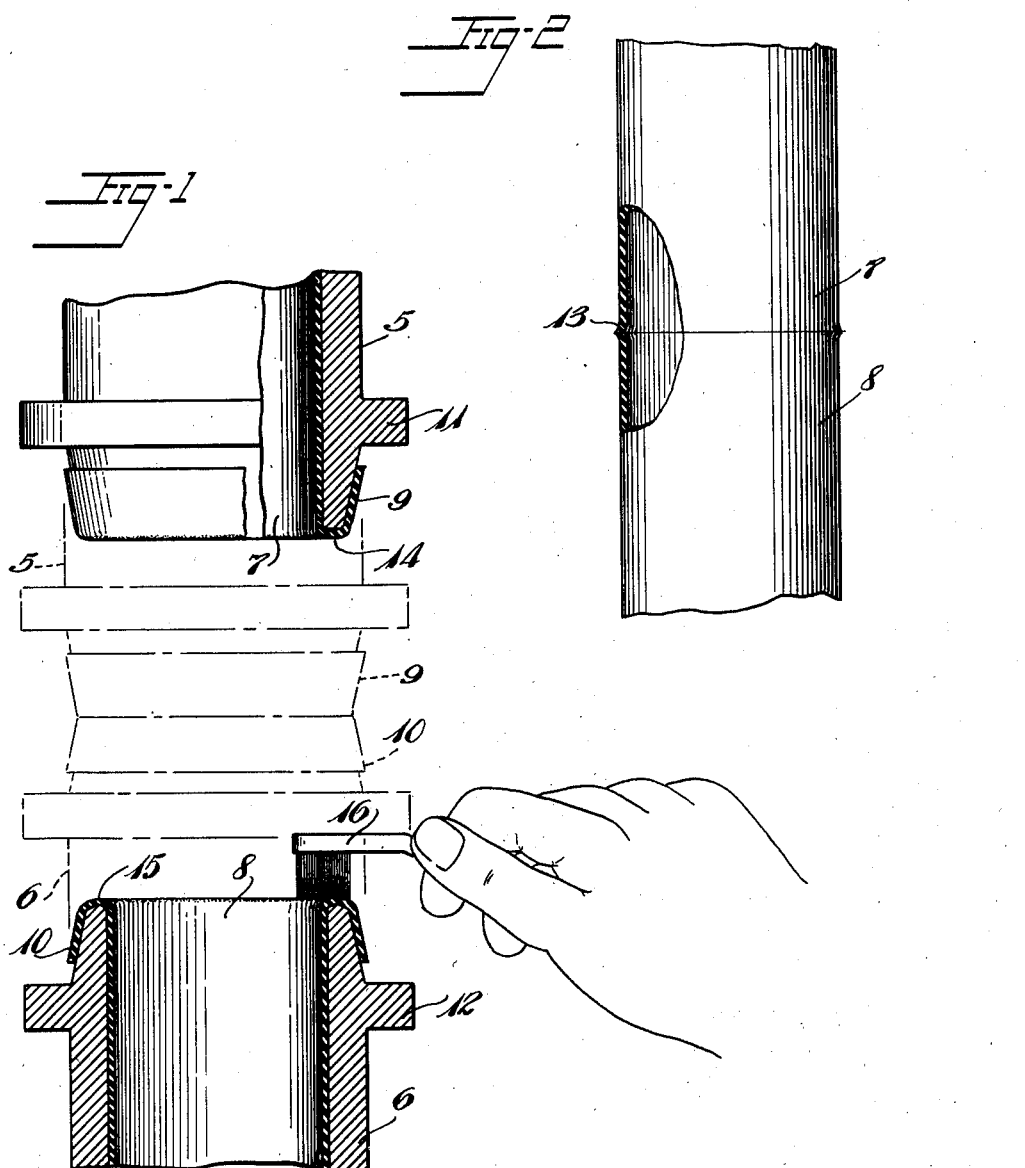

1,921,623

UNITED STATES PATENT OFFICE 1,921,623

METHOD OF SPLICING RUBBER ARTICLES

Charles W. Leguillon, Akron, Ohio, assignor to The B. F. Goodrich Company, New York, N. Y., a Corporation of New York Application September 20, 1930
Serial No. 483,257

13 Claims. (Cl. 154—14)

This invention relates to an improved method for splicing articles of rubber, such for example as uncured sheet rubber stock used in the manufacture of automobile inner tubes. The invention is of special utility in joining the ends of an unvulcanized tube in a die-seamed splice to form an endless tube wherein a splice having great tensile strength is desired.

A tube splicing method commonly used heretofore has involved the employment of a pair of splicing sleeves, one for each end of an unvulcanized tube, the tube ends being placed within the respective sleeves and cuffed back over the ends of the sleeves, whereupon by pressing the sleeves together, the tube ends are joined in an annular seam and the cuffed-back portions are trimmed off. By this method strong splices have been produced, but in some cases, as where the compositions of the tubes have contained a considerable amount of non-adhesive substance, such as pigment, it has been found that the splices produced have not always been wholly satisfactory, the presence of a comparatively large amount of nonadhesive substance in the composition of the tube ends at or upon the contacting surfaces thereof apparently preventing full contact and proper coalescence of the adhesive substance of the tube ends. It has been found desirable in some cases to apply a reinforcing strip to the interior or exterior face of the tube to bridge the splice and compensate for inadequate strength of portions of the die-seamed splice, which increases the bulk of material at the splice and necessitates the expense of added operations.

It is an object of this invention to provide an improved tube splice and procedure for producing the same, whereby a strong splice may be obtained despite the presence of considerable amounts of non-adhesive substances in or upon the surface of the tube. A further object is to avoid the necessity for using a reinforcing strip at the splice. Another object is to avoid the use of a solvent or solvent cement with its attendant evils of fire hazard and discomfort to the operators. A further object is to accomplish these ends by a procedure which is rapid, convenient and inexpensive.

In the drawing which forms a part of this specification:

Fig. 1 is a diagrammatic view, showing a pair of tube-splicing sleeves in fragmentary section, and illustrating the preferred mode of carrying out the present invention.

Fig. 2 is a fragmentary view of a tube embodying a splice made according to the present invention.

Referring to Fig. 1 of the drawing, a pair of sleeves 5 and 6, arranged for relative coaxial movement toward and away from each other, are adapted to accommodate, respectively, the ends 7 and 8 of a tube to be spliced, each tube end lying within the interior of the sleeve and being cuffed back over the end of the sleeve as shown at 9 and 10. The sleeves 5 and 6 are provided with flanges 11 and 12 respectively to afford engaging means for appliances (not shown) to bring the sleeves and tube ends into the broken line positions of Fig. 1, where the tube ends are forced together and spliced at the ends of the sleeves, the cuffed-back portions 9 and 10 of the tube being at the same time pinched off and separated from the tube.

Provision is made for removing the tube from the sleeves, after the tube has been made endless by the splicing, this provision being, for example, in the form of detachable sections of the sleeves (not shown).

As hereinbefore pointed out, the invention contemplates joining the tube ends by an improved splice and the procedure by which this is accomplished will now be explained.

After the tube ends 7 and 8 have been positioned in the sleeves and cuffed back over the ends of the sleeves, as shown in full lines in Fig. 1, and before the sleeves have been moved to effect contact of the tube ends, at least one but preferably both of the annular zones 14 and 15, respectively, of the tube ends adjacent the ends of the sleeves, which zones are subsequently to be brought into splicing contact, are subjected to special treatment. The surfaces of these zones 14 and 15 of the tube are coated with an aqueous dispersion of rubber such as rubber latex or an artificial rubber dispersion, preferably having added thereto a small amount of ammonia or the like, in excess of the amount required as a preservative in storage and transportation of the latex or dispersion, which I find appreciably improves the splice. The dispersion also may have mixed therein a vulcanization accelerator and such pigments as may be desired. The rubber dispersion is applied preferably with a light rubbing or wiping action over the surface of the tube, by means of the finger of the operator or a suitable implement such as the brush 16 shown in Fig. 1, and further rubbing is found to be helpful in obtaining a strong splice. Such rubbing, which may be effected by means of the brush 16, which is preferably of wire and stiff, so as to abrade slightly the surface of the tube, apparently serves to disperse the pigment, dust or other adhesion-preventing foreign substance in the latex coating and it probably also hastens coagulation of particles of the coating. The rubbing or agitation of the coating, increasing the detergent action of the dispersion, probably works away from the tube surface and into the coating particles originally embedded in the rubber surface and brings adhesive particles of the coating into more intimate contact with adhesive particles of the tube. The ammonia or the like probably serves as a cleansing agent and also as a retarder of coagulation so that the foreign particles may be dispersed before coagulation has been carried too far by the rubbing action.

Before forcing the tube ends together it is desirable to permit the coating to dry somewhat, thereby causing it to attain a tacky and pasty state, making for better adhesion with the tube stock.

The tube ends are then ready for splicing and by forcing the sleeves together, end to end, to the broken line positions of Fig. 1, the tube ends may be joined into a splice as indicated at 13, Fig. 2, the cuffed-back portions being pinched off and severed from the tube.

The resulting splice will be found to be strong and of neat appearance, the coating previously applied to the zone of the splice forming an integral part of the tube stock and joining the tube ends by a secure bond, despite the presence of a considerable amount of pigment or other nonadhesive substance at the surface of the tube. The tube is then vulcanized, preferably in a mold, under internal fluid pressure, which smooths the seam and gives the desired strength. The splice thus formed is of adequate and uniform thickness throughout the seam without being unduly bulky and is found to be of such strength that the necessity for using a reinforcing strip to bridge the seam, as has been found desirable in some cases heretofore, is eliminated. Moreover, the necessity for utilizing a solvent or solvent cement is avoided.

It will be understood that the invention is not limited to the embodiment shown and described wherein tubes are spliced by joining their ends, but that it has other applications as well, as where tubes or other articles are spliced along seams extending longitudinally and in other directions relative to their lengths, and that the embodiment herein illustrated and described is not to be taken as limiting my invention except as it is defined in the following claims.

What is claimed is:

1. The method of splicing together two elements of rubber composition which comprises applying to at least one of said elements a composition comprising an aqueous dispersion of rubber, effecting passage of foreign particles into the last said composition and coagulation thereof by a rubbing action, and forcing said elements together.

2. The method of splicing together two elements of rubber composition which comprises applying to at least one of said elements a composition comprising an aqueous dispersion of rubber and ammonia in excess of the amount essential as a preservative, effecting passage of foreign particles into the last said composition and coagulation thereof by a rubbing action, and forcing said elements together.

3. The method of splicing together two elements of unvulcanized rubber composition which comprises applying to at least one of said elements a composition comprising an aqueous dispersion of rubber, effecting passage of foreign particles into the last said composition and coagulation thereof by a rubbing action, forcing said elements together and effecting vulcanization thereof.

4. The method of splicing together two elements of unvulcanized rubber composition which comprises applying to at least one of said elements a composition comprising an aqueous dispersion of rubber and ammonia in excess of the amount essential as a preservative, effecting passage of foreign particles into the last said composition and coagulation thereof by a rubbing action, forcing said elements together and effecting vulcanization thereof.

5. The method of splicing together two sheeted elements of unvulcanized rubber composition which comprises forming a fold in each of said elements, applying to at least one of said elements at the fold thereof a composition comprising an aqueous dispersion of rubber, agitating the last-mentioned composition, and forcing said elements together at their folds.

6. The method of splicing together two sheeted elements of unvulcanized rubber composition which comprises forming a fold in each of said elements, applying to at least one of said elements at the fold thereof a composition comprising an aqueous dispersion of rubber and ammonia in excess of the amount essential as a preservative, agitating the last-mentioned composition, and forcing said elements together at their folds.

7. The method of splicing together two sheeted elements of rubber composition which comprises forming a fold in each of said elements, applying to at least one of said elements at the fold thereof a composition comprising rubber latex, agitating the same, permitting the composition to dry to a pasty consistency, and forcing said elements together at their folds.

8. The method of splicing together two elements of sheeted rubber composition which comprises forming a fold in each of said elements, applying to at least one of said elements at the fold thereof a composition comprising an aqueous dispersion of rubber, agitating said composition, and then simultaneously severing the said elements at the folds thereof and joining the parts at their severed edges.

9. The method of splicing together two tube ends of unvulcanized rubber composition which comprises cuffing back the tube ends, applying to at least one of the folds of the cuffs a composition comprising an aqueous dispersion of rubber, agitating said composition, forcing the tube ends together in a seam at said folds, trimming off excess material from the seam, and vulcanizing the resulting structure in a mold under internal fluid pressure.

10. The method of splicing together two tube ends of unvulcanized rubber composition which comprises cuffing back the tube ends, applying to the folds of the cuffs a composition comprising rubber latex, agitating said composition and abrading slightly the tube surface in contact therewith, permitting the composition to dry to a pasty consistency, and then simultaneously severing the tube ends at the folds of the cuffs and joining the severed edges of the respective tube ends.

11. The method of splicing together two tube ends of unvulcanized rubber composition which comprises cuffing back the tube ends, applying to the folds of the cuffs a composition comprising rubber latex and ammonia, agitating said composition and abrading slightly the tube surface in contact therewith, permitting the composition to dry to a pasty consistency, and then simultaneously severing the tube ends at the folds of the cuffs and joining the severed edges of the respective tube ends.

12. The method of splicing together two elements, at least one of which is of rubber composition, which comprises applying to at least one of said elements a composition comprising an aqueous dispersion of rubber, effecting passage of foreign particles into the last said composition and coagulation thereof by a rubbing action, and forcing said elements together.

13. The method of splicing together two elements, at least one of which is of rubber composition, which comprises applying to the rubber surface a composition comprising an aqueous dispersion of rubber, effecting passage of foreign particles into the last said composition and coagulation thereof by a rubbing action, and forcing said elements together.

CHARLES W. LEGUILLON.